United States Patent [19]

Song et al.

[11] Patent Number: 5,213,731
[45] Date of Patent: May 25, 1993

[54] METHOD FOR MANUFACTURE OF A SINTERED BODY OF AL$_2$O$_3$-TIC SYSTEM USEFUL AS A CUTTING TOOL

[75] Inventors: Han S. Song, Taejeon; Young H. Yoo, Seoul; Joong K. Lee, Taejeon; Sung T. Kwon, Taejeon; Joon T. Kim, Taejeon, all of Rep. of Korea

[73] Assignee: Ssangyong Cement Industrial Co., Ltd., Seoul, Rep. of Korea

[21] Appl. No.: 660,444

[22] Filed: Feb. 22, 1991

[30] Foreign Application Priority Data

Feb. 24, 1990 [KR] Rep. of Korea ............. 90-2362

[51] Int. Cl.$^5$ ............................................. C04B 35/10
[52] U.S. Cl. ............................ 264/65; 51/307; 51/309; 501/87
[58] Field of Search .............. 501/87; 264/65; 51/307, 51/309

[56] References Cited

U.S. PATENT DOCUMENTS

| 4,063,908 | 12/1977 | Ogawa et al. ............ 501/87 |
| 4,356,272 | 10/1982 | Kanemitsu ................ 264/65 |

FOREIGN PATENT DOCUMENTS

| 491444 | 1/1974 | Japan . |
| 51569 | 1/1976 | Japan . |
| 54-104407 | 8/1979 | Japan . |
| 62-45194 | 9/1987 | Japan . |
| 64-1430 | 1/1989 | Japan . |
| 1558743 | 1/1980 | United Kingdom . |

*Primary Examiner*—James Derrington
*Attorney, Agent, or Firm*—Michael N. Meller

[57] ABSTRACT

A method for manufacturing a sintered Al$_2$O$_3$-TiC system containing Y$_2$O$_3$ is described in which TiC has been treated, in the presence of a mixed gas of nitrogen and oxygen, to provide a TiO$_2$ layer on the TiC particles.

2 Claims, No Drawings

METHOD FOR MANUFACTURE OF A SINTERED BODY OF $Al_2O_3$-TIC SYSTEM USEFUL AS A CUTTING TOOL

FIELD OF THE INVENTION

The present invention relates to a method for manufacturing a sintered body of $Al_2O_3$-TiC system useful as a cutting tool. More particularly, the present invention relates to a method for manufacturing a sintered body of $Al_2O_3$-TiC useful as a cutting tool having improved mechanical characteristics including excellent toughness, mechanical strength, abrasion resistance and thermal shock resistance of the sintered body, in which the sintering is allowed even at relatively low temperature by forming a $TiO_2$ layer on the surface of TiC particles used as the main material for sintered body.

TECHNICAL BACKGROUND OF THE INVENTION

Ceramic cutting tools have gained public favor since their development because they are capable of cutting iron or steel at high speed and have excellent abrasion resistance, compared to conventional cutting tools. However, the market share of ceramic cutting tools is only about 5% of the total due to their inherent vulnerability. Therefore, overcoming this vulnerability remains to be solved.

A cutting tool made of $Al_2O_3$-TiC system has recently been getting public favor by overcoming the former deficiency of toughness and because of the decrease of rust. However, since such cutting tools of the $Al_2O_3$-TiC system are made from a material which is difficult to be sintered if it is not at a high temperature, and there are many problems including the high cost of production and the complexity of processing.

Though many studies for producing a dense sintered body of the $Al_2O_3$-TiC system have been made, it is difficult to produce a perfectly dense sintered body because TiC is difficult to be sintered compared to $Al_2O_3$ and the mechanical characteristics of the sintered body decreases because gases such as $Al_2O_3$ or $O_2$ are generated at the interface between $Al_2O_3$ and TiC during the sintering reaction to form pores in the sintered body.

Because of the difficulty in sintering, methods such as using HIP(Hot Isostatic Pressing After Sintering), by Hot-Pressing, by sintering quickly, raising the temperature to 1800° C. or more, or by adding sintering assistants such as $Y_2O_3$ and etc. have conventionally been used.

However, the method by Hot-Pressing provides a difficulty in diversifying the shape of the sintered body because only one sintered body is produced by pressing and therefore is not proper for mass production. Also, since the temperature is suddenly raised to a high temperature, the sintered body suffers from thermal shock. As a result, the transformation or the breaking of the sintered body occurs. Moreover, it is very difficult to obtain a dense sintered body because of the bending of the body by unequal heating and volatilization on the surface of the sintered body.

To overcome such problems, several methods have been proposed.

For example, Japanese Patent Publication Sho. 49-1444 discloses a method comprising the addition of sintering assistants such as NiO and MgO to the main material of sintered body in order to prevent the decrease of strength by inhibiting the growth of $Al_2O_3$ particles and by improving the bond intensity of $Al_2O_3$ and TiC. Japanese Patent Publication Sho. 56-140066 discloses a method comprising the addition of sintering assistants such as MgO, NiO, or $Cr_2O_3$ to obtain a dense sintered body. However, said methods induce the growth of $Al_2O_3$ crystals which decrease the characteristics required for a cutting tool such as mechanical strength and toughness.

On the other hand, Japanese Patent Publication Sho. 51-569, Sho. 62-45194, Sho. 64-1430 and Japanese Patent Laid-Open Publication Sho. 54-104407 disclose methods comprising the addition of $TiO_2$ powder as a sintering assistant to obtain a dense sintered body. Though the bond intensity and the wettability are improved by this method, the sintered body is easily broken by thermal shock resulting from high-speed cutting because $TiO_2$, TiC and TiCO are not homogeneously mixed inside the sintered body.

SUMMARY OF THE INVENTION

The present inventors have found that previously mentioned problems are due to the reaction generated at the interface between $Al_2O_3$ and TiC particles, and have solved them by forming a $TiO_2$ layer on the surface of TiC particles.

A further object of the present invention is to provide a method for producing a sintered body of the $Al_2O_3$-TiC system having improved mechanical characteristics including excellent toughness, mechanical strength, abrasion resistance and thermal shock resistance by allowing the sintering to be carried out at a low temperature.

DETAILED DESCRIPTION OF THE INVENTION

The present invention provides a method for manufacturing a sintered body of $Al_2O_3$-TiC system useful as a cutting tool which comprises the following steps:

(A) mixing $Al_2O_3$, TiC and $Y_2O_3$;
(B) pulverizing the mixture;
(C) treating the mixture at a temperature between 200° C. and 500° C. under an atmosphere containing $N_2$ and $O_2$ to form a $TiO_2$ layer on the surface of the TiC particle; and
D) sintering the mixture at a temperature between 1600° C. and 1850° C. under an atmosphere containing argon.

In addition, the present invention includes a method for manufacturing a sintered body of $Al_2O_3$-TiC system useful as a cutting tool which comprises the following steps:

(a) treating TiC at a temperature between 200° C. and 500° C. under an atmosphere containing $N_2$ and $O_2$ to form a $TiO_2$ layer on the surface of the TiC particles;
(b) mixing the TiC having the $TiO_2$ layer thereon with $Al_2O_3$ and $Y_2O$;
(c) pulverizing the mixture; and
(d) sintering it at a temperature between 1600° C. and 1850° C. under an atmosphere containing argon.

With the $TiO_2$ layer being homogeneously formed on the surface of TiC powder according to the present invention, the $TiO_2$ layer allows the homogeneous sintering reaction of $Al_2O_3$ with TiC and the inhibition of the reaction at the interface between $Al_2O_3$ and TiC. Moreover, the $TiO_2$ layer which is formed shows the same effect as that of the addition of $TiO_2$.

Therefore, the present invention shows not only provides for the lowering of the temperature of sintering and for inhibiting the growth of $Al_2O_3$ crystal particles, but aslo the effect of improving mechanical strength, abrasion resistance and the thermal shock resistance of a sintered body. Consequently, it is specially useful for making cutting tools for high speed cutting.

Generally, the interface-reaction of $Al_2O_3$ and TiC generates CO gas. The generated CO gas forms pores inside of the sintered body and, consequently, decreases the physical properties. According to present invention, in order to restrain the formation of gas, $Al_2O_3$ and TiO are treated under an oxidation atmosphere at the temperature of between 200° C. and 500° C. As a result, the layer of $TiO_2$ is formed homogeneously on the surface of the TiC powder. The formed $TiO_2$ layer acts as a sintering assistant to lower the sintering temperature and to improve the physical properties of the sintered body. Namely, the $TiO_2$ layer promotes the bonding of $Al_2O_3$ and TiO (i.e., improving of cross-linkage intensity) and restrains the generation of CO gas forming the pores (i.e., restraint of interface-reaction). Therefore, when using the sintered body of the present invention as a cutting tool, the final physical properties are improved because the formation of crystal particles of $Al_2O_3$ is restrained. Consequently, the formation of $TiO_2$ layer shows the effect of the addition of $TiO_2$, though $TiO_2$ is not actually added.

Conventionally known reactions at the interface between $Al_2O_3$ and TiC particles proceed according to the following reaction formulas:

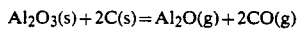

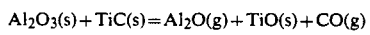

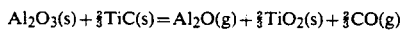

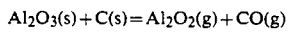

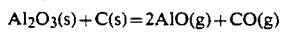

in which (s) is solid phase and (g) is gas phase.

In the above reaction formulas, the main materials generating gas are $Al_2O_3$, TiC and C. Since the mechanical characteristics such as toughness, strength, abrasion resistance and resistance to thermal shock decreases due to pores formed in the sintered body by the generated gas, the pores prohibit this material from being used in a high speed cutting generating high temperature.

Therefore, according to the present invention, TiC powder is oxidized at a temperature between 200° C. and 500° C. under an oxidation atmosphere to form the $TiO_2$ layer. The $TiO_2$ layer prevents the reaction of $Al_2O_3$ with TiC during the sintering. Moreover, the $TiO_2$ layer on the surface of TiC acts as a sintering aid at the interface between $Al_2O_3$ and TiC particles to permit the sintering temperature to be dropped.

As a result, the mechanical characteristics including abrasion resistance and thermal shock resistance of the sintered body are remarkably improved.

Since the effect of addition of $TiO_2$ by this method is better than the effect of addition of $TiO_2$ in powder form as described in Japanese Patent Publication Sho. 51-569, Sho. 64-1430 etc., the abrasion resistance of the cutting tool is improved and the life of the cutting tool is lengthened by improving the bond intensity of $Al_2O_3$ and TiC.

Also, in order to prevent breaking the cutting tool caused by thermal shock at about 1300° C. generated by high speed cutting which is a demerit of a sintered body produced by the addition of $TiO_2$ in powder form, the mixture of TiC having the $TiO_2$ layer with $Al_2O_3$ and $Y_2O_3$ enables one to make a cutting tool of the $Al_2O_3$-TiC system having excellent characteristics for mechanical strength, abrasion resistance, resistance to thermal shock etc., improves the sinterability and inhibits the growth of crystal particles.

The reason for generating the above-mentioned effects are explained as follows.

The TiC having the $TiO_2$ layer thereon shows almost the same hardness of TiC and improves the bond intensity of $Al_2O_3$ and TiC and prevents the generation of pores due to the $TiO_2$ layer formed only on the surface. As a result, the mechanical strength, the abrasion resistance, etc., are improved.

Furthermore, the $TiO_2$ layer of the present invention acts as a bridge material joining $Al_2O_3$ and TiC crystal particles to prevent the damage of the cutting tool due to the rupture or transformation of crystal particles caused by high heat of about 1300° C. generated during high-speed cutting, which is the harshest condition under which a cutting tool is used. Thus, the resistance to thermal shock and the ability of cutting are improved and the lifetime of cutting tools is lengthened about 1.5 times compared to those of the prior art.

Also, because the reaction of TiC with the metal work-piece is partially inhibited by the $TiO_2$ layer, the resistance to thermal shock and the ability of cutting are remarkably improved.

According to the present invention. $Al_2O_3$, TiC and $Y_2O_3$ are mixed in a ratio of 80:20 to 20:80 and 0.1 to 2% weight. The mixture is a powder of 0.1 to 2 $\mu m$ size. The mixing can be carried out using alcohol as a solvent in a WC jar for 24 to 48 hours. The mixed slurry is dried to a cake phase, and then pulverized to the size of 0.1 to 100 $\mu m$. This size is proper to homogeneously form a $TiO_2$ layer on the surface of TiC particles. The pulverized mixture is held at a temperature between 200° C. and 500° C. under an atmosphere containing $N_2$ and $O_2$; thereby, the surface of the TiC is thinly oxidized to form the $TiO_2$ layer thereon.

Alternatively, TiC is oxidized at a temperature between 200° C. and 500° C. under a oxidation atmosphere containing $N_2$ and $O_2$, and then the TiC having the $TiO_2$ layer is mixed with $Al_2O_3$ and $Y_2O_3$ wherein the ratio of $Al_2O_3$; TiC; $Y_2O_3$ is made 80:20 to 20:80 and 0.1 to 2% by weight. This procedure also shows the same effects. As a preferred condition for forming the $TiO_2$ layer, the TiC powder, having an average size of 1 to 5 $\mu m$, is treated at 350° C. for an hour. A most stable and homogeneous $TiO_2$ layer is thus obtained.

The flow rate of mixed gas of $N_2$ and $O_2$ is 0.2 to 0.4 l/min.

The pulverized powder thus formed is molded and then sintered in an atmosphere containing argon. The sintering is advantageously carried out at a temperature between 1600° C. and 1850° C. and the time of sintering is about 0.5 to 1 hour.

On the other hand, because the toughness of a cutting tool of the $Al_2O_3$-TiC system depends on the size of the particles of a sintered body, it considerably affects the ability of cutting and using especially at high speeds. Because the higher the sintering temperature is, the larger the size of particles of a sintered body would be, HIP is carried out after sintering to obtain a dense sintered body sufficiently approaching theoretical density with the fine particles. It is desirable to carry out HIP under a pressure between 1400 MPa and 2000 MPa at a temperature between 1450° C. and 1650° C. under an atmosphere containing argon for 0.5 to 1 hour.

Since the $TiO_2$ layer homogeneously formed on the surface of TiC powder allows the homogenous sintering reaction of $Al_2O_3$ with TiO and the inhibition of interface reaction and provides the effect of the addition of $TiO_2$, the temperature of sintering decreases and the growth of crystal particles of $Al_2O_3$ is inhibited. As a result, the mechanical strength, the abrasion resistance and the resistance to thermal shock of the thus formed sintered body increases.

Therefore, the sintered body produced by the method of the present invention can be used as a cutting tool that is especially useful in cutting at high speed.

The density of a sintered body needs to be more than 95% TD (true density) and then to be 100% TD after HIP.

The present invention is illustrated by the following examples.

EXAMPLES 1 TO 50 AND COMPARATIVE EXAMPLES 1 TO 11

TiC powder having an average particle size of 1.5 μm, $Al_2O_3$ powder having an average particle size of 0.5 μm and $Y_2O_3$ powder having an average particle size of 0.9 μm were homogeneously mixed in a composition ratio shown in Table 1 in WC bowl for 24 hours and then dried.

The dried cake was pulverized again to be a minute powder to enlarge the surface area of the powder in a pulverizing machine. The surface of the TiC was oxidized to form a $TiO_2$ layer under the conditions shown in Table 1. The mixed gas comprising $N_2$ and $O_2$ in a ratio of 2:1 by volume was allowed to flow into the $TiO_2$ layer-forming furnace at 0.31 l/min.

The calcined powder was lightly pulverized with molding assistance in a pulverizing machine and then molded under a pressure of 1 ton/cm$^2$.

The resulting molding body was buried in the powder having the same composition as the molding body, and sintered in an atmosphere containing argon under the conditions shown in Table 1.

The increase of rate of the temperature was about 10° C./min. up to 1100° C. before sintering and 20° to 100° C. min. up to 1600° C.~1850° C. as shown in Table 2.

The resulting sintered body gained in sufficient density to be HIP treated in an atmosphere containing argon and simultaneously the remaining pores were removed. HIP was conducted at a temperature of 1600° C. under a pressure of 1500 MPa in an atmosphere containing argon for an hour.

Also, the phase analysis for the sintered body was carried out through XRD, and HV and KIC were measured to analyze the mechanical characteristics of the sintered body through a Vicker's Indenter.

The results are shown in Table 1 and the processing characteristics and physical characteristics of a sintered body which was not calcinated are shown compared with the materials of the present invention. Among the examples, the fact that the sintered body of the present invention showed no detection of $TiO_2$ in the phase analysis of KRD was assumed to be caused by the re-transition of $TiO_2$ to TiC by reaction with carbon in the sintering atmosphere using a graphite furnace.

TABLE 1

| | Composition (% by weight) | | | TiO$_2$ layer-forming condition | | sintering condition | | temp.-raising rete (°C./min.) | Characteristics | | | | | | |
|---|---|---|---|---|---|---|---|---|---|---|---|---|---|---|---|
| | | | | | | temp | time | | sintering density (g/min.) | phase | | | HIP density (gr/cm$^3$) | Hv (kg/mm$^2$) | KIC MN/m3/2 |
| | Al$_2$O$_3$ | TiC | Y$_2$O$_3$ | temp (°C.) | time (hr.) | (°C.) | (hr.) | | | Al$_2$O$_3$ | TiC | TiO$_2$ | | | |
| Example | | | | | | | | | | | | | | | |
| 1 | 79 | 20 | 1 | 200 | 2 | 1650 | 0.5 | 20 | 4.109 | ○ | ○ | x | 4.15 | 1820 | 2.75 |
| 2 | 79 | 20 | 1 | 350 | 0.5 | 1750 | 0.5 | 50 | 4.152 | ○ | ○ | x | 4.15 | 1850 | 2.85 |
| 3 | 79 | 20 | 1 | 500 | 1 | 1650 | 0.5 | 100 | 4.123 | ○ | ○ | ○ | 4.15 | 1790 | 2.7 |
| 4 | 69 | 30 | 1 | 200 | 2 | 1750 | 1 | 100 | 4.17 | ○ | ○ | x | 4.23 | 1980 | 3.12 |
| 5 | 69 | 30 | 1 | 200 | 1 | 1650 | 0.5 | 50 | 3.90 | ○ | ○ | x | 4.01 | 1630 | 3.6 |
| 6 | 69 | 30 | 1 | 350 | 1 | 1700 | 0.5 | 50 | 4.15 | ○ | ○ | x | 4.22 | 1995 | 3.15 |
| 7 | 69 | 30 | 1 | 350 | 1 | 1750 | 1 | 100 | 4.20 | ○ | ○ | x | 4.23 | 1990 | 3.20 |
| 8 | 69.5 | 30 | 0.5 | 350 | 1 | 1650 | 0.5 | 50 | 3.83 | ○ | ○ | x | 3.85 | 1540 | 4.2 |
| 9 | 69.5 | 30 | 0.5 | 350 | 2 | 1750 | 1 | 100 | 4.15 | ○ | ○ | ○ | 4.21 | 1985 | 3.15 |
| 10 | 69.5 | 30 | 0.5 | 400 | 1 | 1700 | 0.5 | 50 | 4.17 | ○ | ○ | ○ | 4.21 | 1992 | 3.01 |
| 11 | 69.5 | 30 | 0.5 | 400 | 0.5 | 1650 | 1 | 100 | 4.00 | ○ | ○ | ○ | 4.05 | 1632 | 4.5 |
| 12 | 69.5 | 30 | 0.5 | 350 | 0.5 | 1800 | 0.5 | 50 | 4.20 | ○ | ○ | x | 4.21 | 1993 | 2.98 |
| 13 | 49 | 50 | 1 | 400 | 1 | 1800 | 0.5 | 50 | 4.19 | ○ | ○ | ○ | 4.30 | 2005 | 3.7 |
| 14 | 29 | 70 | 1 | 350 | 0.5 | 1800 | 0.5 | 50 | 4.43 | ○ | ○ | ○ | 4.62 | 2070 | 4.3 |
| 15 | 19 | 80 | 1 | 400 | 1 | 1850 | 1 | 50 | 4.54 | ○ | ○ | ○ | 4.72 | 2150 | 3.8 |
| Comparative Example | | | | | | | | | | | | | | | |
| 1 | 79 | 20 | 1 | not forming | | 1650 | 0.5 | 20 | 4.08 | ○ | ○ | x | 4.15 | 1830 | 2.65 |
| 2 | 79 | 20 | 1 | not forming | | 1750 | 0.5 | 50 | 4.13 | ○ | ○ | x | 4.15 | 1870 | 2.54 |
| 3 | 69 | 30 | 1 | not forming | | 1750 | 1 | 100 | 4.08 | ○ | ○ | x | 4.23 | 1970 | 2.8 |
| 4 | 69 | 30 | 1 | not forming | | 1650 | 0.5 | 50 | 3.82 | ○ | ○ | x | 3.95 | 1620 | 3.6 |
| 5 | 69 | 30 | 1 | | | 1700 | 0.5 | 50 | 4.09 | ○ | ○ | x | 4.22 | 1990 | 2.9 |
| 6 | 69.5 | 30 | 0.5 | not forming | | 1650 | 1 | 50 | 3.80 | ○ | ○ | x | 3.85 | 1540 | 4.2 |
| 7 | 69.5 | 30 | 0.5 | not forming | | 1700 | 0.5 | 100 | 4.06 | ○ | ○ | x | 4.21 | 1992 | 2.75 |
| 8 | 69.5 | 30 | 0.5 | | | 1750 | 0.5 | 50 | 4.12 | ○ | ○ | x | 4.21 | 1970 | 2.80 |
| 9 | 49 | 50 | 1 | not forming | | 1800 | 0.5 | 50 | 4.18 | ○ | ○ | x | 4.30 | 2002 | 3.4 |
| 10 | 29 | 70 | 1 | not forming | | 1800 | 0.5 | 50 | 4.39 | ○ | ○ | x | 4.61 | 2085 | 4.1 |
| 11 | 19 | 80 | 1 | not forming | | 1850 | 1 | 50 | 4.62 | ○ | ○ | x | 4.75 | 2091 | 3.5 |

What is claimed is:

1. A method for manufacturing a sintered body of an $Al_2O_3$-TiC system useful as a cutting tool, which comprises the following steps:

a) mixing particles of $Al_2O_3$, TiC and $Y_2O_3$ to form a mixture;
b) pulverizing the mixture;
c) treating the mixture under a mixed gas atmosphere to form a $TiO_2$ layer on a surface of the TiC particles; and
d) sintering the mixture at a temperature between 1600° C. and 1850° C. under an argon atmosphere;
characterized in that the mixture of step (c) is treated at a temperature between 200° C. and 500° C. under a mixed gas atmosphere containing $N_2$ and $O_2$ wherein the mixed gas has a flow rate between 0.2 l/min and 0.4 l/min and treating is conducted for a time between 0.5 and 2 hours.

2. A method for manufacturing a sintered body of an $Al_2O_3$-TiC system useful as a cutting tool, which comprises the following steps:
(a) treating particles of $TiC_2$ under a mixed gas atmosphere to form a $TiO_2$ layer on a surface of the TiC particles;
(b) mixing the TiC having the $TiO_2$ layer thereon with $Al_2O_3$ and $Y_2O_3$ to form a mixture;
(c) pulverizing the mixture; and
(d) sintering the mixture at a temperature between 1600° C. and 1850° C. under an argon atmosphere;
characterized in that the TiC particles in step (a) are treated at a temperature between 200° C. and 500° C. under a mixed gas atmosphere containing $N_2$ and $O_2$ wherein the mixed gas has a flow rate between 0.2 l/min and 0.4 l/min and treating is conducted for a time between 0.5 and 2 hours.

* * * * *